(12) United States Patent
Lee et al.

(10) Patent No.: US 9,596,472 B2
(45) Date of Patent: *Mar. 14, 2017

(54) METHOD AND APPARATUS FOR ENTROPY ENCODING USING HIERARCHICAL DATA UNIT, AND METHOD AND APPARATUS FOR DECODING

(71) Applicant: SAMSUNG ELECTRONICS CO., LTD., Suwon-si (KR)

(72) Inventors: Tammy Lee, Seoul (KR); Jianle Chen, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/603,268

(22) Filed: Jan. 22, 2015

(65) Prior Publication Data

US 2015/0139333 A1    May 21, 2015

Related U.S. Application Data

(63) Continuation of application No. 14/130,541, filed as application No. PCT/KR2012/005255 on Jul. 2, 2012.

(Continued)

(51) Int. Cl.
*H04N 19/91* (2014.01)
*H04N 19/13* (2014.01)
(Continued)

(52) U.S. Cl.
CPC .......... *H04N 19/13* (2014.11); *H04N 19/119* (2014.11); *H04N 19/12* (2014.11); *H04N 19/136* (2014.11);
(Continued)

(58) Field of Classification Search
None
See application file for complete search history.

(56) References Cited

U.S. PATENT DOCUMENTS 7,304,590 B2    12/2007  Park
7,777,654 B2    8/2010   Chang
(Continued)

FOREIGN PATENT DOCUMENTS

CN    101076114 A    11/2007
CN    101491097 A    7/2009
(Continued)

OTHER PUBLICATIONS

Communication dated Feb. 3, 2015 issued by the Korean Intellectual Property Office in counterpart Korean Patent Application No. 10-2014-0059298.

(Continued)

*Primary Examiner* — Mohammed Rahaman
(74) *Attorney, Agent, or Firm* — Sughrue Mion, PLLC

(57) ABSTRACT

Provided are video encoding and decoding methods and apparatuses. The video encoding method includes: encoding a video based on data units having a hierarchical structure; determining a context model used for entropy encoding a syntax element of a data unit based on at least one piece of additional information of the data units; and entropy encoding the syntax element by using the determined context model.

1 Claim, 18 Drawing Sheets

Related U.S. Application Data

(60) Provisional application No. 61/503,685, filed on Jul. 1, 2011, provisional application No. 61/548,423, filed on Oct. 18, 2011.

(51) Int. Cl.

| | |
|---|---|
| *H04N 19/119* | (2014.01) |
| *H04N 19/136* | (2014.01) |
| *H04N 19/176* | (2014.01) |
| *H04N 19/96* | (2014.01) |
| *H04N 19/157* | (2014.01) |
| *H04N 19/426* | (2014.01) |
| *H04N 19/60* | (2014.01) |
| *H04N 19/18* | (2014.01) |
| *H04N 19/12* | (2014.01) |
| *H04N 19/186* | (2014.01) |
| *H04N 19/61* | (2014.01) |

(52) U.S. Cl.
CPC ......... *H04N 19/157* (2014.11); *H04N 19/176* (2014.11); *H04N 19/18* (2014.11); *H04N 19/186* (2014.11); *H04N 19/426* (2014.11); *H04N 19/60* (2014.11); *H04N 19/91* (2014.11); *H04N 19/96* (2014.11); *H04N 19/61* (2014.11)

(56) References Cited

U.S. PATENT DOCUMENTS

| | | | |
|---|---|---|---|
| 8,233,544 B2 | 7/2012 | Bao et al. | |
| 8,743,969 B2 | 6/2014 | Sasai et al. | |
| 8,897,363 B2 | 11/2014 | Jung et al. | |
| 8,934,541 B2 | 1/2015 | Cho et al. | |
| 9,148,665 B2 | 9/2015 | Cheon et al. | |
| 2005/0114093 A1 | 5/2005 | Cha et al. | |
| 2005/0156762 A1* | 7/2005 | Tsuru ..................... | H04N 19/91 341/107 |
| 2005/0219069 A1 | 10/2005 | Sato et al. | |
| 2006/0158355 A1 | 7/2006 | Jeon et al. | |
| 2006/0233240 A1 | 10/2006 | Cha et al. | |
| 2007/0009047 A1 | 1/2007 | Shim et al. | |
| 2007/0110153 A1 | 5/2007 | Cho et al. | |
| 2008/0219578 A1 | 9/2008 | Lee | |
| 2009/0263030 A1 | 10/2009 | Ramasastry et al. | |
| 2010/0027624 A1* | 2/2010 | Yu ........................... | 375/240.12 |
| 2010/0046626 A1 | 2/2010 | Tu et al. | |
| 2011/0249754 A1* | 10/2011 | Karczewicz ......... | H04N 19/176 375/240.18 |
| 2012/0106649 A1* | 5/2012 | Wang .................... | H04N 19/159 375/240.18 |
| 2012/0328003 A1* | 12/2012 | Chien et al. ............. | 375/240.03 |
| 2014/0003513 A1 | 1/2014 | Chen et al. | |
| 2015/0156513 A1 | 6/2015 | Lee et al. | |
| 2015/0195539 A1 | 7/2015 | Lee et al. | |
| 2015/0249840 A1 | 9/2015 | Kim et al. | |
| 2015/0326854 A1 | 11/2015 | Jung et al. | |
| 2015/0326879 A1 | 11/2015 | Alshina et al. | |

FOREIGN PATENT DOCUMENTS

| | | |
|---|---|---|
| EP | 1548616 B1 | 8/2009 |
| EP | 2663075 A2 | 11/2013 |
| JP | 2014-521244 A | 8/2014 |
| JP | 2015-167379 A | 9/2015 |
| KR | 10-2004-0106392 A | 12/2004 |
| KR | 10-2005-0045746 A | 5/2005 |
| KR | 10-2006-0109239 A | 10/2006 |
| KR | 10-2007-0006445 A | 1/2007 |
| KR | 10-2007-0051681 A | 5/2007 |
| KR | 10-2008-0082147 A | 9/2008 |
| KR | 10-2011-0017719 A | 2/2011 |
| KR | 10-2011-0017721 A | 2/2011 |
| KR | 10-2011-0017783 A | 2/2011 |
| RU | 2237283 C2 | 9/2004 |
| RU | 2368095 C1 | 9/2009 |
| RU | 2371881 C1 | 10/2009 |
| WO | 2010/002214 A2 | 1/2010 |
| WO | WO2010143853 A2 * | 12/2010 ............... H04N 7/12 |
| WO | 2011/010900 A2 | 1/2011 |
| WO | 2011/019234 A2 | 2/2011 |
| WO | 2012167097 A1 | 12/2012 |
| WO | 2012176463 A1 | 12/2012 |

OTHER PUBLICATIONS

Communication dated Jan. 23, 2015 issued by the European Patent Office in counterpart European Patent Application No. 12808068.6.

Detlev Marpe et al.; "Context-Based Adaptive Binary Arithmetic Coding in the H.264/AVC Video Compression Standard"; IEEE Transactions on Circuits and Systems for Video Technology, vol. 13; No. 7; Jul. 1, 2003; pp. 620-636; XP-002509017.

Ken McCann et al.; "Samsung's Response to the Call for Proposals on Video Compression Technology"; Joint Collaborative Team on Video Coding (JCT-VC) of ITU-T SG16 WP3 and ISO/IEC JTC1/SC29/WG11; Apr. 15-23, 2010; 42 pages total; http://wftp3.itu.int/av-arch/jctvc-site/; XP030007572.

International Search Report dated Dec. 27, 2012 issued in International Application No. PCT/KR2012/005255 (PCT/ISA/210 and 220), 7 pages in English and Korean.

Written Opinion, dated Dec. 27, 2012, issued in International Application No. PCT/KR2012/005255, 7 pages in English and Korean. (PCT/ISA/237).

Notice of Non-Final Rejection, dated May 12, 2014, issued by the Korean Intellectual Property Office in counterpart Korean Application No. 10-2012-0071985, 8 pages in English and Korean.

Notice of Allowance, dated Aug. 19, 2014, isused by the Korean Intellectual Property Office in counterpart Application No. 10-2012-0071985, 8 pages in English and Korean.

Sze et al, "CE11: Reduced neighboring dependency in context selection of significant_coeff_flag for parallel processing (E330)," Joint Collaborative Team on Video Coding (JCT-VC) of ITU-T SG16 WP3 and ISO/IEC JTCI/SC29/WG11, 6th Meeting, Torino, IT, Jul. 14-22, 2011, 6 pages.

Non-Final Rejection, dated Dec. 24, 2014, issued in corresponding JP Application No. 2014-518820, 3 pages in English and Japanese.

Communication dated May 18, 2015 issued by the Korean Intellectual Property Office in counterpart Korean Patent Application No. 10-2014-0148738.

Thomas Wiegand et al; "WD3: Working Draft 3 of High-Efficiency Video Coding"; Joint Collaborative Team on Video Coding (JCT-VC) of ITU-T SG16 WP3 and ISO/IEC JTC1/SC29/WG11; Mar. 16-23, 2011; 223 pgs. total (Doc. No. JCTVC-E603).

Che, et al.; "Enhanced Context Modeling for Skip and Split Flag", Joint Collaborative Team on Video Coding (JCT-VC) of ITU-T SG16 WP3 and ISO/IEC JTC1/SC29/WG11, Jan. 2011, 5 pages total.

Chen, et al.; "Simplified Context Model Selection for Block Level Syntax Coding", Joint Collaborative Team on Video Coding (JCT-VC) of ITU-T SG16 WP3 and ISO/IEC JTC1/SC29/WG11, Jul. 2011, 9 pages total.

Chien, et al.; "Memory and Parsing Friendly CABAC Context", Joint Collaborative Team on Video Coding (JCT-VC) of ITU-T SG16 WP3 and ISO/IEC JTC1/SC29/WG11, Jul. 2011, 18 pages total.

Communication dated Sep. 29, 2015, issued by the Japanese Patent Office in counterpart Japanese Application No. 2014-518820.

Communication dated Nov. 30, 2015, issued by the IP Australia in counterpart Australian Application No. 2012278484.

Communication dated Oct. 20, 2015, issued by the Korean Intellectual Property Office in counterpart Korean Application No. 10-2015-0047484.

Communication dated Oct. 20, 2015, issued by the Korean Intellectual Property Office in counterpart Korean Application No. 10-2015-0047485.

(56) References Cited

OTHER PUBLICATIONS

Communication dated Jan. 20, 2016, from the European Patent Office in counterpart European Application No. 12808068.6.
Communication dated Feb. 5, 2016, from the State Intellectual Property Office of People's Republic of China in counterpart Application No. 201510199710.6.
Communication dated Mar. 8, 2016, from the Japanese Patent Office in counterpart application No. 2014-518820.
Christopher Rosewarne et al., "Predicted neighbour for context selection of significant_coeff_flag for parallel processing", Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F186, (7 Pages Total).
Communication dated Mar. 8, 2016, from the Japanese Patent Office in counterpart application No. 2015-088253.
Communication dated Apr. 21, 2016, issued by the Russian Patent Office in counterpart Russian Application No. 2014103482.
Communication dated Jun. 22, 2016, issued by the State Intellectual Property Office of P.R. China in counterpart Chinese Application No. 201280042737.9.

* cited by examiner

ENCODING UNIT (1010)

PREDICTION UNIT (1060)

| COMBINATION VALUE | ctxIdx |
|---|---|
| $S_1$ | 2 |
| $S_2$ | 1 |
| ⋮ | ⋮ |
| $S_m$ | 4 |

| COMBINATION VALUE | ctxIdx |
|---|---|
| $S_1$ ⋮ $S_2$ | 2 |
| $S_{X+1}$ ⋮ $S_Y$ | 0 |
| $S_{Y+1}$ ⋮ $S_Z$ | 1 |
| ⋮ | ⋮ |

| CtxIdx | 0 | 1 | 2 | 3 | ... |
|---|---|---|---|---|---|
| pStateIdx | 12 | 7 | 41 | 22 | ... |
| MPS | 1 | 0 | 0 | 1 | ... |

1900

METHOD AND APPARATUS FOR ENTROPY ENCODING USING HIERARCHICAL DATA UNIT, AND METHOD AND APPARATUS FOR DECODING

CROSS-REFERENCE TO RELATED APPLICATIONS

This application is a continuation application of U.S. application Ser. No. 14/130,541, filed Mar. 21, 2014, which is a 371 National Stage Application of PCT/KR2012/005255, filed Jul. 2, 2012, which claims priority to U.S. Provisional Application No. 61/503,685, filed Jul. 1, 2011, and U.S. Provisional Application No. 61/548,423, filed Oct. 18, 2011, each of which is incorporated herein by reference in its entirety.

TECHNICAL FIELD

The present invention relates to encoding and decoding a video, and more particularly, to entropy encoding and entropy decoding syntax elements forming video data.

BACKGROUND ART

In image compressing methods, such as MPEG-1, MPEG-2, and MPEG-4 H.264/MPEG-4 advanced video coding (AVC), an image is divided into a plurality of blocks having predetermined sizes, and then residual data of the blocks are obtained via inter prediction or intra prediction. The residual data is compressed via transformation, quantization, scanning, run length coding, and entropy encoding. During the entropy encoding, a bitstream is output by entropy encoding syntax elements, such as discrete cosine transform (DCT) coefficients or motion vectors. In terms of a decoder, syntax elements are extracted from a bitstream, and decoding is performed based on the extracted syntax elements.

DETAILED DESCRIPTION OF THE INVENTION

Technical Problem

The present invention provides a method and apparatus for combining additional information including syntax elements to select a context model to be used for entropy encoding the syntax elements, thereby efficiently entropy encoding and decoding the syntax elements.

Technical Solution

According to one or more embodiments of the present invention, a context model for entropy encoding a syntax element of a current data unit based on an available syntax element of the current data unit.

Advantageous Effects

According to one or more embodiments of the present invention, a required size of a memory for storing pre-restored peripheral information may be reduced by selecting a context model based on information about a data unit including a current syntax element, instead of using the previously restored peripheral information.

BRIEF DESCRIPTION OF THE DRAWINGS

FIGS. 18A and 18B are diagrams of context indexes for determining a context model according to a combination of additional information, according to embodiments of the present invention.

BEST MODE

Figure 1:
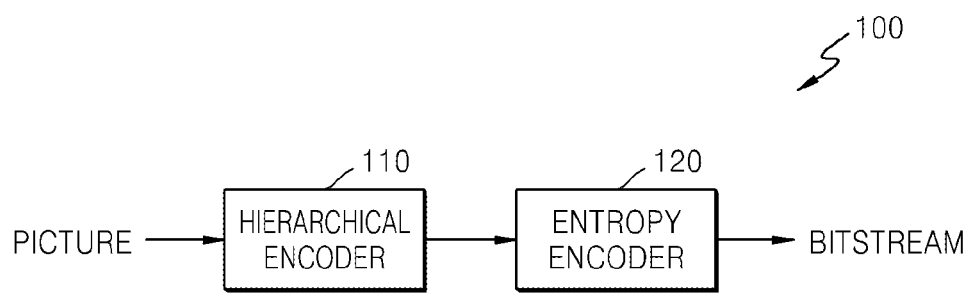
FIG. 1 is a block diagram of a video encoding apparatus according to an embodiment of the present invention.

According to an aspect of the present invention, there is provided a video encoding method including: encoding a video based on data units having a hierarchical structure; determining a context model used for entropy encoding of a first syntax element of a current data unit to be entropy-encoded based on at least one second syntax element of the current data unit, wherein the at least one second syntax element is usable and different from the first syntax element of the current data unit; and entropy encoding the first syntax element of the current data unit by using the determined context model.

According to another aspect of the present invention, there is provided a video encoding apparatus including: a hierarchical encoder for encoding a video based on data units having a hierarchical structure; and an entropy encoder for determining a context model used for entropy encoding of a first syntax element of a current data unit to be entropy-encoded based on at least one second syntax element of the current data unit, wherein the at least one second syntax element is usable and different from the first syntax element of the current data unit, and entropy encoding the first syntax element of the current data unit by using the determined context model.

According to another aspect of the present invention, there is provided a video decoding method including: extracting syntax elements of a picture encoded based on data units having a hierarchical structure by parsing an encoded bitstream; determining a context model used to entropy decode a first syntax element of a current data unit to be entropy-decoded based on at least one second syntax element of the current data unit, wherein the at least one second syntax element is usable and different from the first syntax element of the current data unit; and entropy decoding the first syntax element by using the determined context model.

According to another aspect of the present invention, there is provided a video decoding apparatus including: an syntax element extractor for extracting syntax elements of a picture encoded based on data units having a hierarchical structure by parsing an encoded bitstream; and an entropy decoder for determining a context model used to entropy decode a first syntax element of a current data unit to be entropy-decoded based on at least one second syntax element of the current data unit, wherein the at least one second syntax element is usable and different from the first syntax element of the current data unit, and entropy decoding the first syntax element by using the determined context model.

Mode of the Invention

Hereinafter, an 'image' used in various embodiments of the present invention may not only denote a still image, but may also denote a moving image, such as a video.

When various operations are performed on data related to an image, the data related to the image may be divided into data groups, and the same operation may be performed on data included in the same data group. Hereinafter, a data group formed according to a predetermined standard is referred to as a 'data unit'. Also, an operation performed according to 'data units' is performed by using data included in a corresponding data unit.

Hereinafter, video encoding and decoding methods and apparatuses for encoding and decoding syntax elements having a tree structure based on coding units according to a hierarchical tree structure, according to embodiments of the present invention will be described with reference to FIGS. 1 through 13. Also, entropy encoding and decoding processes used in the video encoding and decoding methods of FIGS. 1 through 14 will be described in detail with reference to FIGS. 14 through 24.

FIG. 1 is a block diagram of a video encoding apparatus 100 according to an embodiment of the present invention.

The video encoding apparatus 100 includes a hierarchical encoder 110 and an entropy encoder 120.

The hierarchical encoder 110 splits a current picture to be encoded into data units having predetermined sizes, and encodes the data units. In detail, the hierarchical encoder 110 may split a current picture based on a maximum coding unit. The maximum coding unit according to an embodiment of the present invention may be a data unit having a size of 32×32, 64×64, 128×128, 256×256, etc., wherein a shape of the data unit is a square having a width and a length that are each a multiple of 2 and greater than 8.

A coding unit according to an embodiment of the present invention may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an embodiment of the present invention is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The hierarchical encoder 110 encodes at least one split region obtained by splitting a region of the maximum coding unit according to depths, and determines a depth to output a finally encoded image data according to the at least one split region. In other words, the hierarchical encoder 110 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the entropy encoder 120.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the hierarchical encoder 110 may determine coding units having a tree structure included in the maximum coding unit. The 'coding units having a tree structure' according to an embodiment of the present invention include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an embodiment of the present invention is an index related to the number of splitting times from a maximum coding unit to a minimum coding unit. A first maximum depth according to an embodiment of the present invention may denote the total number of splitting times from the maximum coding unit to the minimum coding unit. A second maximum depth according to an embodiment of the present invention may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into 4^1 transformation units, and the size of the transformation unit is thus N×N, and may be 2 when each of the height and width of the current coding unit is split into four equal parts, totally split into 4"2 transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the hierarchical encoder 110 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to embodiments of the present invention, will be described in detail later with reference to FIGS. 3 through 12.

The hierarchical encoder 110 may measure an encoding error of deeper coding units according to depths by using Rate-Distortion Optimization based on Lagrangian multipliers.

The entropy encoder 120 outputs the image data of the maximum coding unit, which is encoded based on the at least one coded depth determined by the coding unit determiner 120, and information about the encoding mode according to the coded depth, in bitstreams. The encoded image data may be obtained by encoding residual data of an image. The information about the encoding mode according to coded depth may include information about the coded depth, about the partition type in the prediction unit, the prediction mode, and the size of the transformation unit. In detail, as described below the entropy encoder 120 selects a context model based on additional information of a current data unit, such as information about the hierarchical structure of the data units and about a color component used in a video encoding method, and performs entropy encoding, while encoding the image data of the maximum coding unit and syntax elements about the encoding mode according to depths. Here, the entropy encoder 120 may determine the context model for entropy encoding the syntax elements of the current coding unit by considering additional information of the current coding unit as well as additional information of an adjacent coding unit. A process of determining the context model for entropy encoding the syntax elements will be described in detail later.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the entropy encoder 120 may assign encoding information about a corresponding coded depth and an encoding mode to at least one of the coding unit, the prediction unit, and a minimum unit included in the maximum coding unit.

The minimum unit according to an embodiment of the present invention may be a rectangular data unit obtained by splitting the minimum coding unit constituting the lowermost depth by 4, and may be a maximum rectangular data unit that may be included in all of the coding units, prediction units, partition units, and transformation units included in the maximum coding unit.

For example, the encoding information output through the entropy encoder 120 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
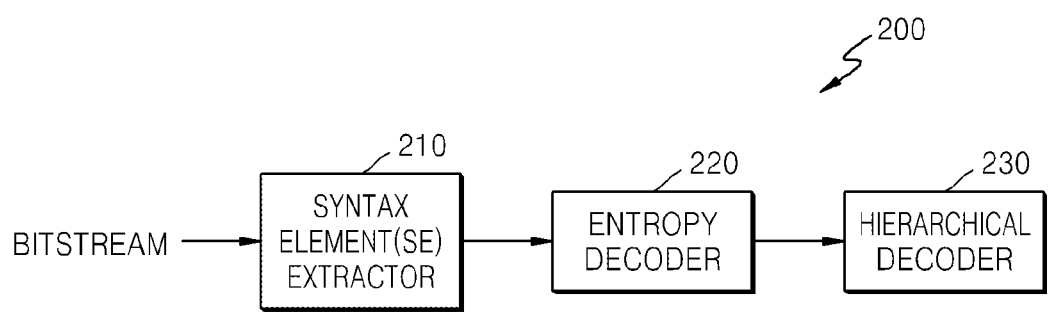
FIG. 2 is a block diagram of a video decoding apparatus according to an embodiment of the present invention.

FIG. 2 is a block diagram of a video decoding apparatus 200 according to an embodiment of the present invention.

The video decoding apparatus 200 includes a syntax element extractor 210, an entropy decoder 220, and a hierarchical decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The syntax element extractor 210 receives and parses a bitstream of an encoded video. The entropy decoder 220 extracts encoded image data for each coding unit from the parsed bitstream, wherein the coding units have a tree structure according to each maximum coding unit, and outputs the extracted image data to the hierarchical decoder 230.

Also, the entropy decoder 220 extracts additional information about a coded depth, an encoding mode, a color component, and a prediction mode for the coding units having a tree structure according to each maximum coding unit, from the parsed bitstream. The extracted additional information is output to the hierarchical decoder 230. In other words, the image data in a bit stream is split into the maximum coding unit and then encoded so that the hierarchical decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the entropy decoder 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the entropy decoder 220 may extract the information about the coded depth and the encoding mode according to the predetermined data units. The predetermined data units to which the same information about the coded depth and the encoding mode is assigned may be inferred to be the data units included in the same maximum coding unit.

In detail, as described below, the entropy decoder 220 selects a context model and performs entropy decoding based on various types of information, such as information about a hierarchical structure of data units described above and about color components, while decoding syntax elements.

The hierarchical decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The hierarchical decoder 230 may perform intra prediction or motion compensation according to a partition and a prediction mode of each coding unit, based on the information about the partition type and the prediction mode of the prediction unit of the coding unit according to coded depths.

Also, the hierarchical decoder 230 may perform inverse transformation according to each transformation unit in the coding unit, based on the information about the size of the transformation unit of the coding unit according to coded depths, so as to perform the inverse transformation according to maximum coding units.

The hierarchical decoder 230 may determine at least one coded depth of a current maximum coding unit by using split information according to depths. If the split information indicates that image data is no longer split in the current depth, the current depth is a coded depth. Accordingly, the hierarchical decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the hierarchical decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an embodiment of the present invention, will now be described with reference to FIGS. 3 through 13.

Figure 3:
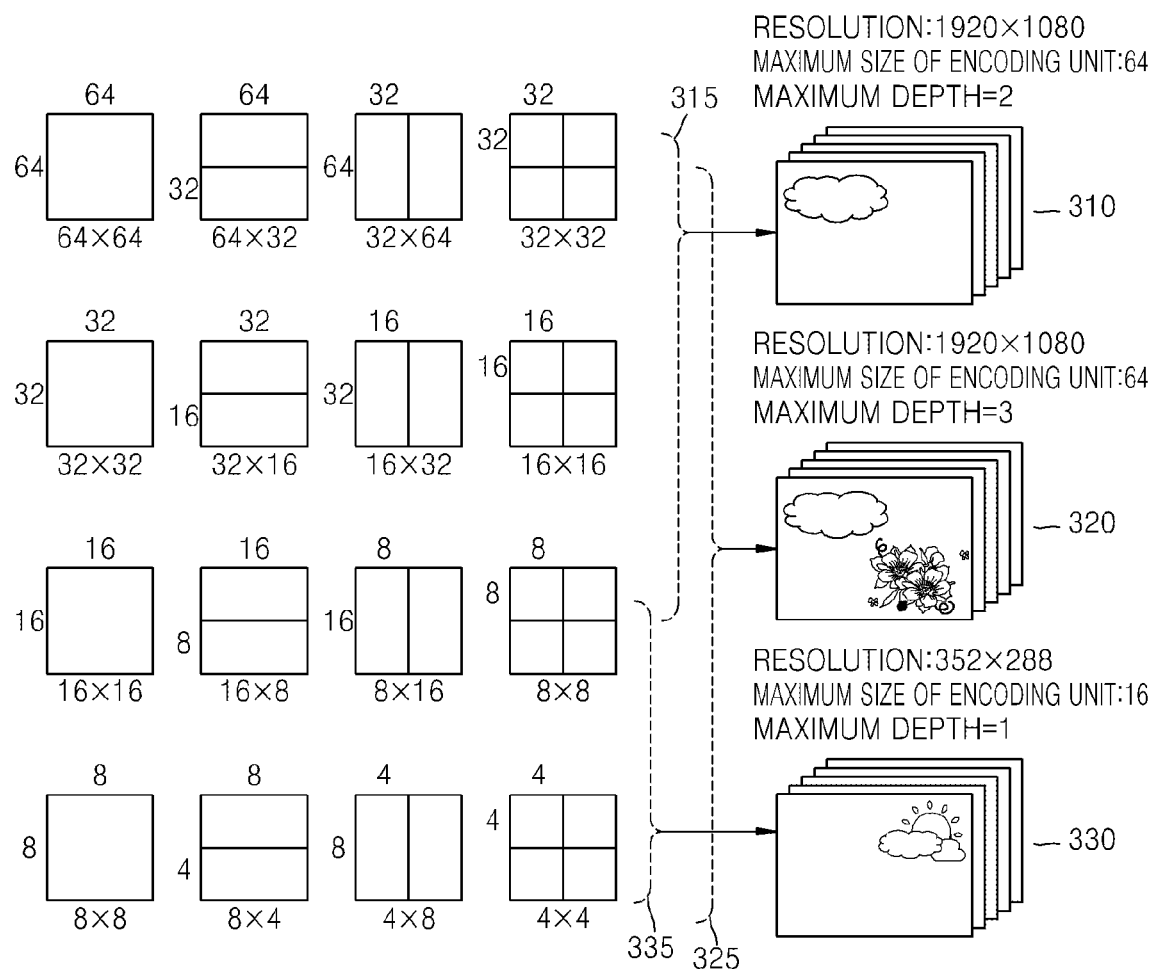
FIG. 3 is a diagram for describing a concept of coding units according to an embodiment of the present invention.

FIG. 3 is a diagram for describing a concept of coding units according to an embodiment of the present invention.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to increase encoding efficiency and to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
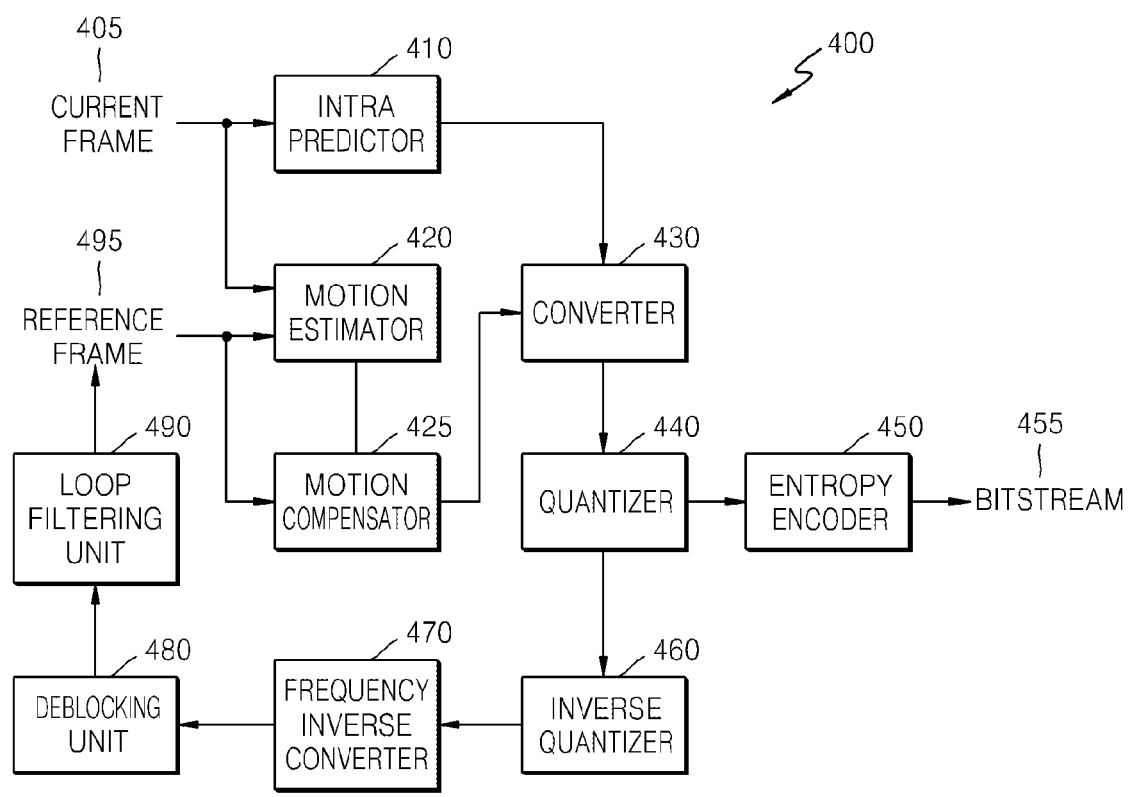
FIG. 4 is a detailed block diagram of an image encoder based on coding units having a hierarchical structure according to an embodiment of the present invention.

FIG. 4 is a detailed block diagram of an image encoder 400 based on coding units having a hierarchical structure according to an embodiment of the present invention.

An intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

The entropy encoder 450 selects a context model and performs entropy decoding based on various types of information, such as information about a hierarchical structure of data units and about color components, while encoding image data of a maximum coding unit and syntax elements about an encoding mode according to depths.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure. Also, the entropy encoder 450 selects a context model used to entropy encode syntax elements and performs entropy encoding, based on various types of information, such as information about a hierarchical structure of data units and about color components, according to types of the syntax elements.

Figure 5:
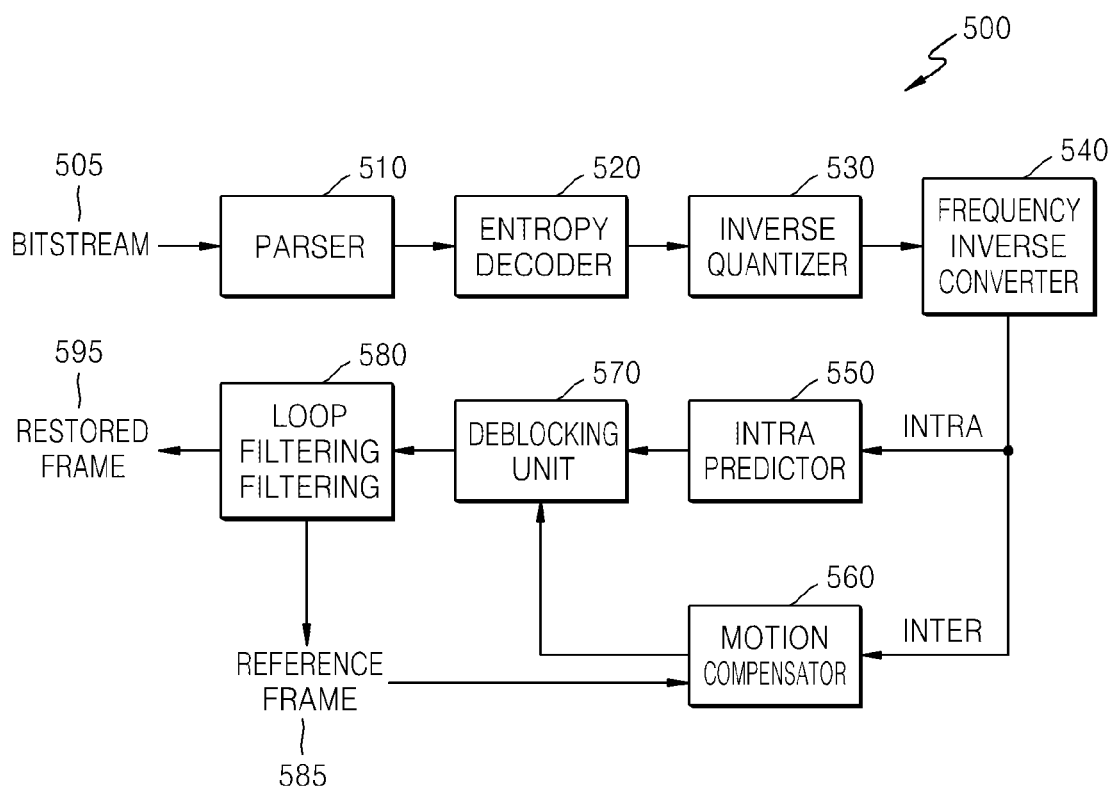
FIG. 5 is a detailed block diagram of an image decoder based on coding units having a hierarchical structure according to an embodiment of the present invention.

FIG. 5 is a detailed block diagram of an image decoder 500 based on coding units having a hierarchical structure according to an embodiment of the present invention.

A parser 510 parses encoded image data to be decoded and information about encoding required for decoding from a bitstream 505. The encoded image data is output as inverse quantized data through the entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain that are restored while passing through the intra predictor 550 and the motion compensator 560 may be post-processed through a deblocking unit 570 and a loop filtering unit 580 and may be output as a restored frame 595. Also, data post-processed through the deblocking unit 570 and the loop filtering unit 580 may be output as the reference frame 585.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 may perform decoding operations based on coding units having a tree structure for each maximum coding unit.

Specifically, the intra prediction 550 and the motion compensator 560 may determine partitions and a prediction mode for each of the coding units having a tree structure, and the inverse transformer 540 may determine a size of a transformation unit for each coding unit. Also, the entropy decoder 520 selects a context model used to entropy decode encoded image data to be decoded and syntax elements indicating encoding information required for decoding, and performs entropy decoding, based on various types of information, such as information about a hierarchical structure of data units and about color components, according to types of the syntax elements.

Figure 6:
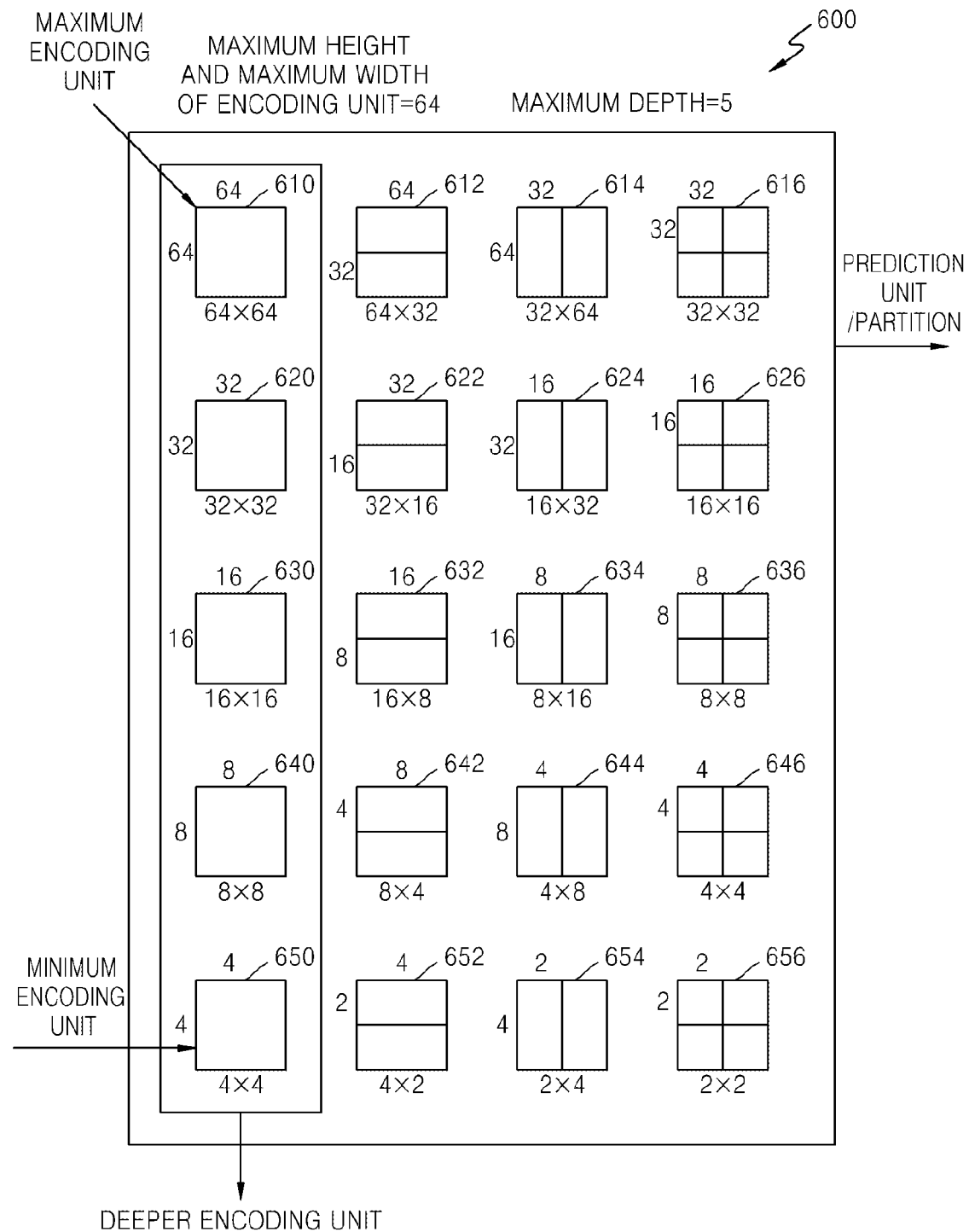
FIG. 6 is a diagram illustrating deeper coding units according to depths, and partitions according to an embodiment of the present invention.

FIG. 6 is a diagram illustrating deeper coding units according to depths, and partitions, according to an embodiment of the present invention.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an embodiment of the present invention, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
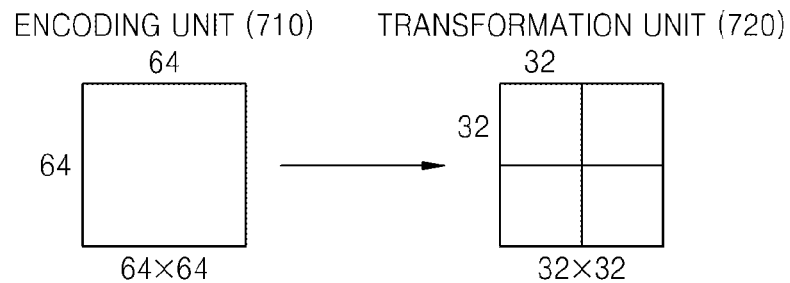
FIG. 7 is a diagram for describing a relationship between a coding unit and transformation units, according to an embodiment of the present invention.

FIG. 7 is a diagram for describing a relationship between a coding unit 710 and transformation units 720, according to an embodiment of the present invention.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
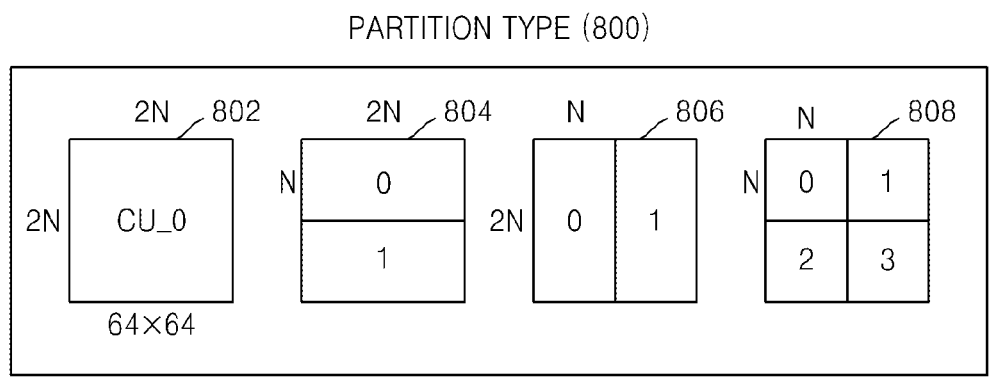
FIG. 8 is a diagram for describing encoding information of coding units corresponding to a coded depth, according to an embodiment of the present invention.
Figure 8:
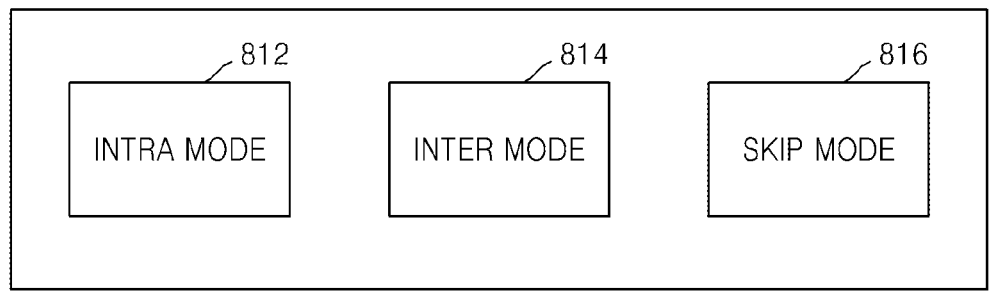
Figure 8:
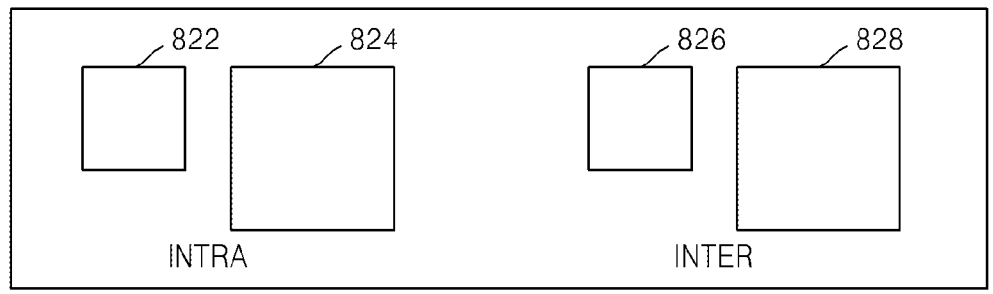

FIG. 8 is a diagram for describing encoding information of coding units corresponding to a coded depth, according to an embodiment of the present invention.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
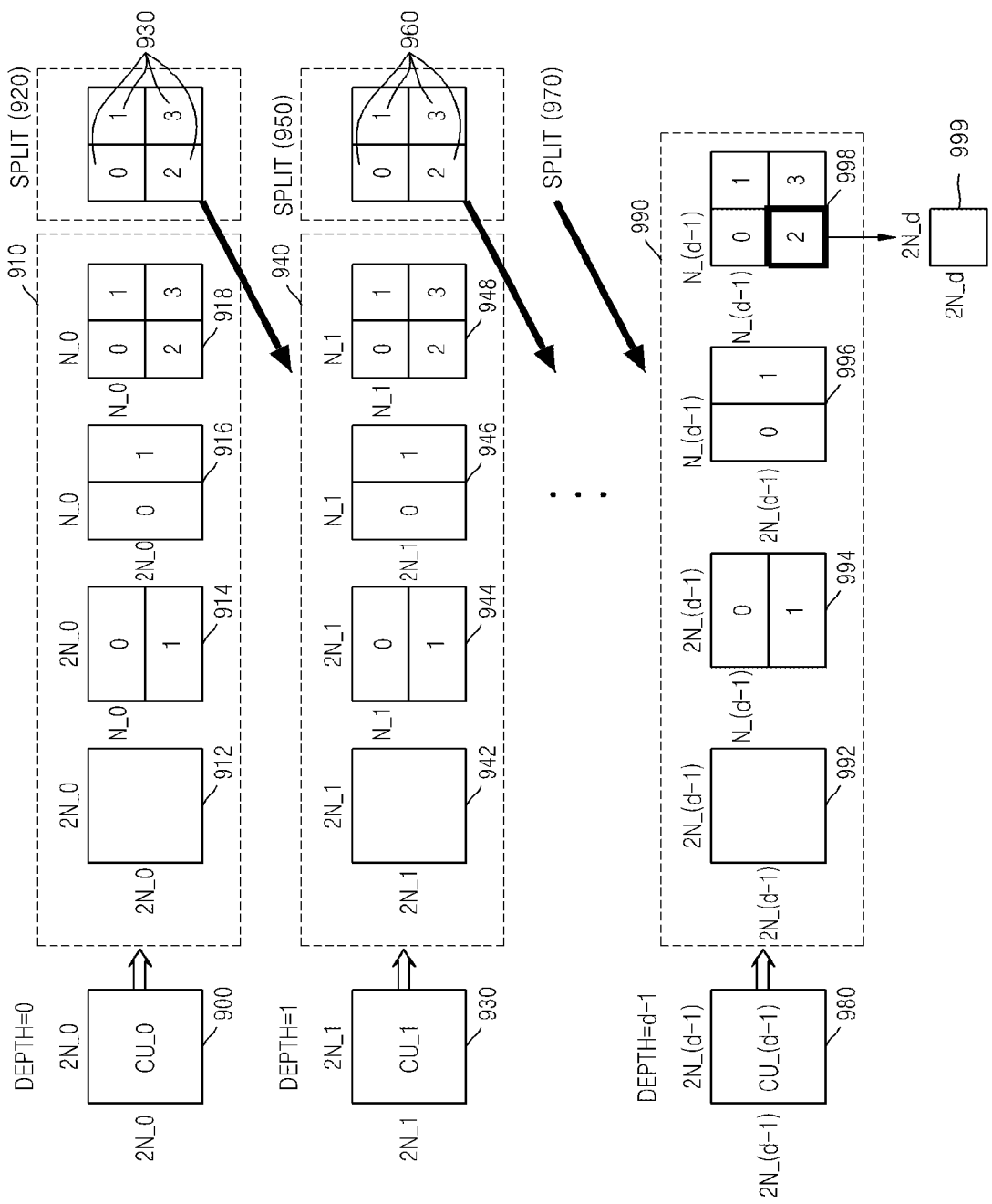
FIG. 9 is a diagram of deeper coding units according to depths, according to an embodiment of the present invention.

The image data and encoding information extractor 220 of the video decoding apparatus 200 may extract and use the information 800, 810, and 820 for decoding, according to each deeper coding unit FIG. 9 is a diagram of deeper coding units according to depths, according to an embodiment of the present invention.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an embodiment of the present invention may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
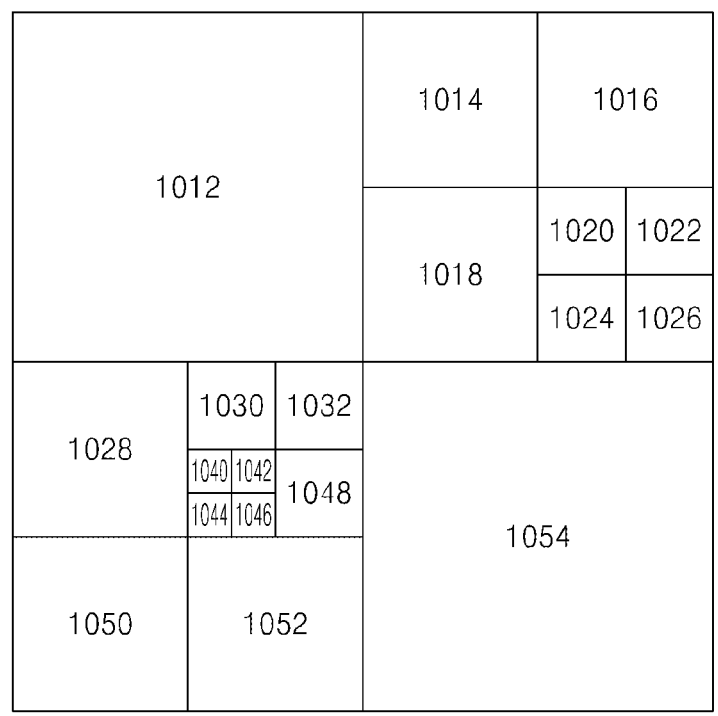
FIGS. 10 through 12 are diagrams for describing a relationship between coding units, prediction units, and transformation units, according to an embodiment of the present invention.
Figure 11:
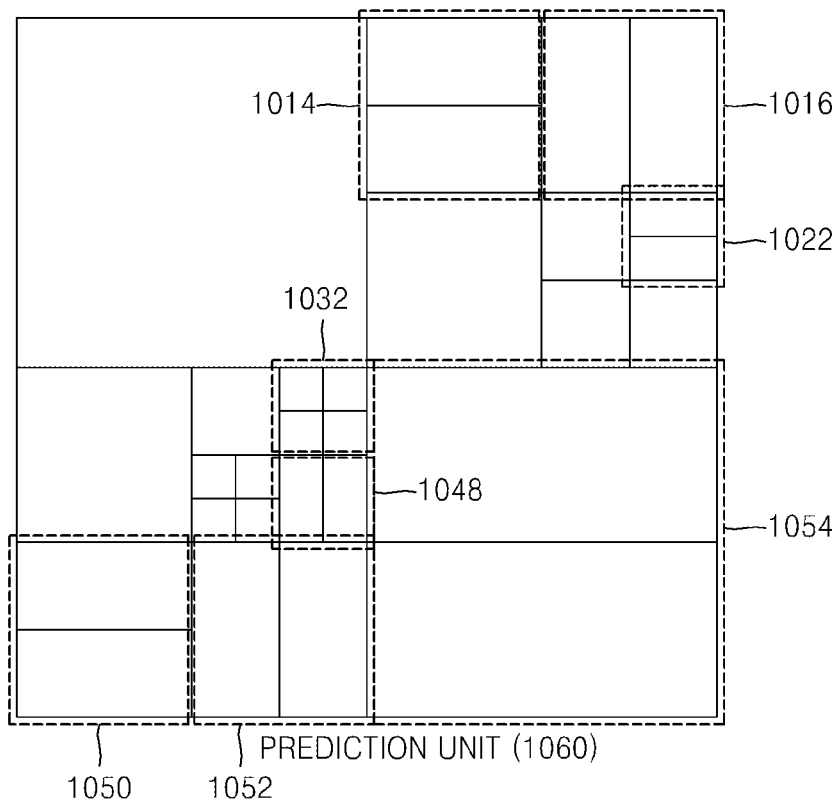
Figure 12:
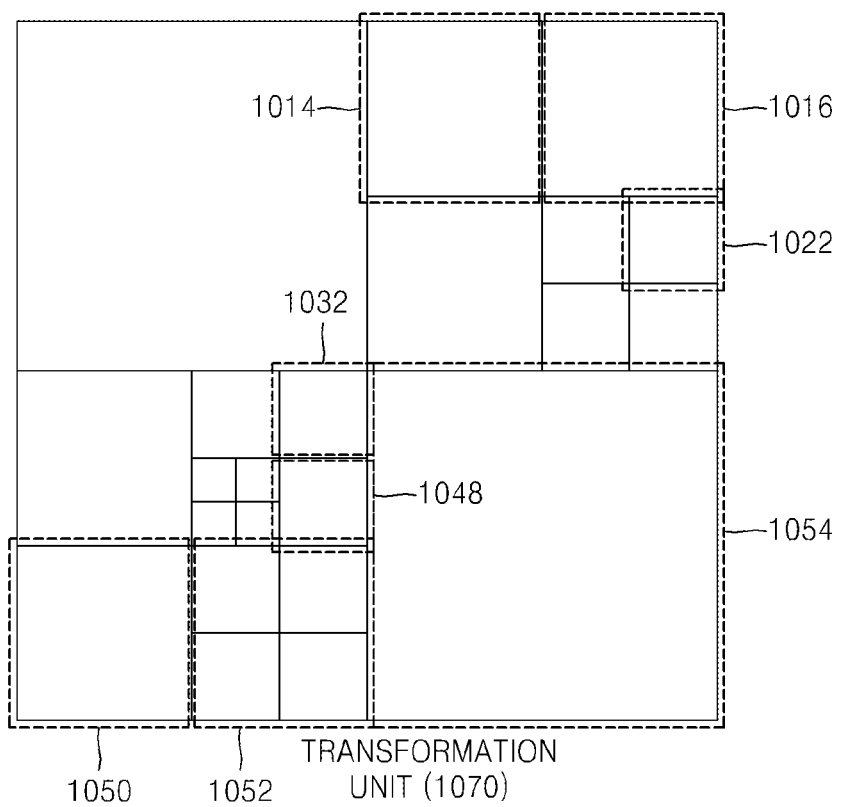

FIGS. 10 through 12 are diagrams for describing a relationship between coding units 1010, prediction units 1060, and transformation units 1070, according to an embodiment of the present invention.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The entropy encoder 120 of the video encoding apparatus 100 may output the encoding information about the coding units having a tree structure, and the entropy decoder 210 of the video decoding apparatus 200 may parse a received bitstream and extract the encoding information about the coding units having a tree structure from the received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:n and n:1, and the asymmetrical partition types having the sizes of nL×2N and nR×2N may be respectively obtained by splitting the width of the prediction unit in 1:n and n:1. Here, n is an integer higher than 1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
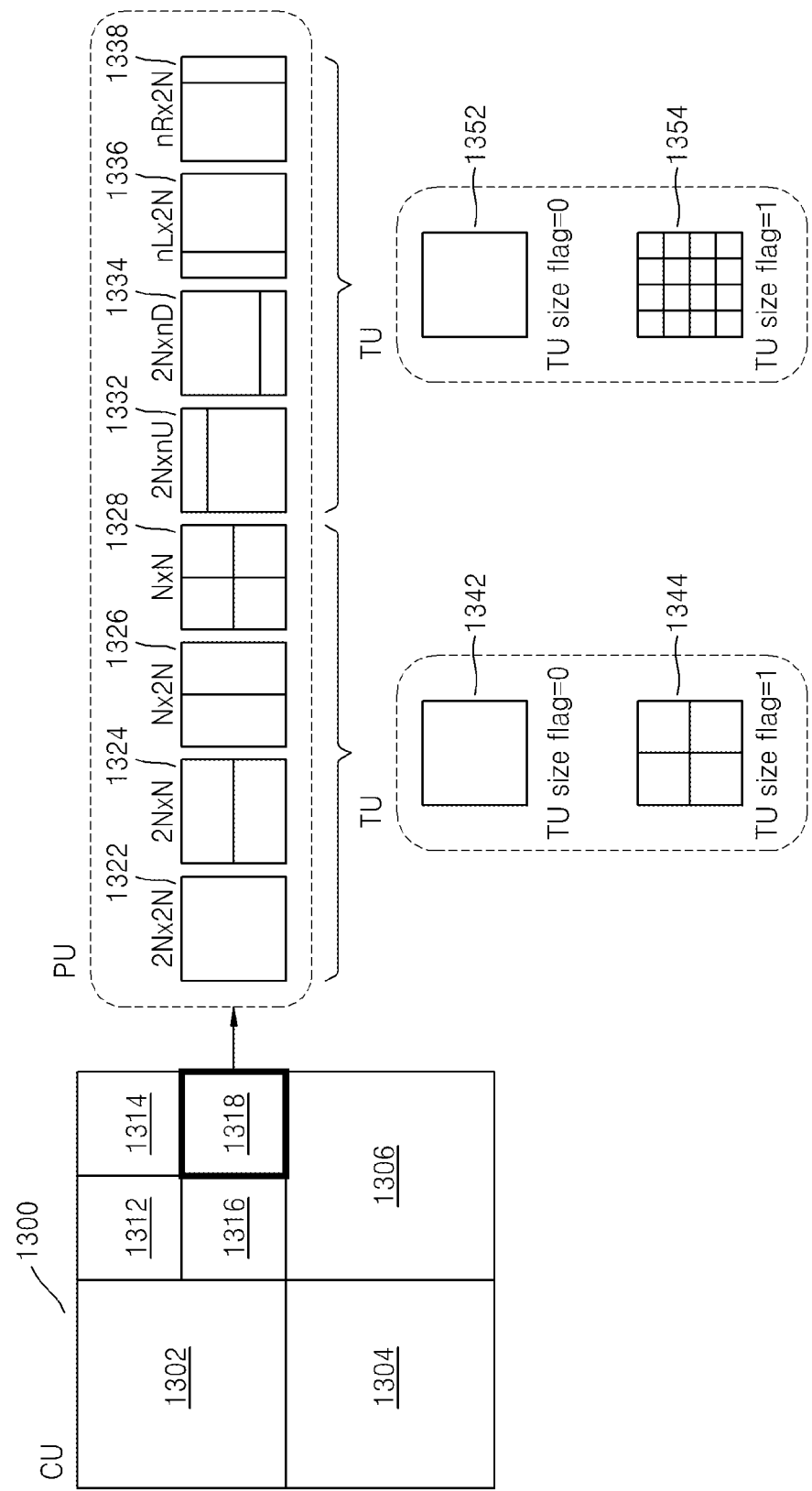
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Transformation unit split information TU size flag may be a type of a transformation index, and a size of a transformation unit corresponding to a transformation index may vary according to a prediction unit type or partition type of a coding unit.

For example, when the partition type is set to be symmetrical, i.e. the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 9, the TU size flag is a flag having a value or 0 or 1, but the TU size flag is not limited to 1 bit, and a transformation unit may be hierarchically split having a tree structure while the TU size flag increases from 0. The TU size flag may be used as an example of a transformation index.

In this case, the size of a transformation unit that has been actually used may be expressed by using a TU size flag of a transformation unit, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize = \max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

The maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = \min(MaxTransformSize, PUSize) \quad (2)$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = \min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

Hereinafter, a process of entropy encoding a syntax element, which is performed by the entropy encoder 120 of the video encoding apparatus 100 of FIG. 1, and a process of entropy encoding a syntax element, which is performed by the entropy decoder 220 of the video decoding apparatus 200 of FIG. 2 will be described in detail.

As described above, the video encoding apparatus 100 and the video decoding apparatus 200 according to the embodiments of the present invention perform encoding and decoding by splitting a maximum coding unit by using a coding unit equal to or less than the maximum coding unit. A prediction unit and a transformation unit used during prediction and transformation processes may be determined based on a cost independently from another data unit. As such, data units having a tree structure may be configured by determining an optimum coding unit as encoding is recursively performed according to coding units having a hierarchical structure included in a maximum coding unit. In other words, coding units having a tree structure, and prediction units and transformation units having a tree structure may be determined according to a maximum coding unit. For decoding, hierarchical information indicating a hierarchical structure of data units, and information other than the hierarchical information for decoding may be transmitted.

The hierarchical information is required to determine the coding units, prediction units, and transformation units having the tree structure described above with reference to FIGS. 10 through 12, and includes a size of a maximum coding unit, a coded depth, partition information of a prediction unit, a split flag indicating whether a coding unit is split, size information of a transformation unit, and TU size flag indicating whether a transformation unit is split. The information other than the hierarchical information includes prediction mode information of intra/inter prediction applied to each prediction unit, motion vector information, prediction direction information, color component information applied to a corresponding data unit when a plurality of color components are used, and texture information, such as a transformation coefficient. Hereinafter, the hierarchical information and the information other than the hierarchical information transmitted for decoding may be referred to as syntax elements to be entropy encoded.

Figure 14:
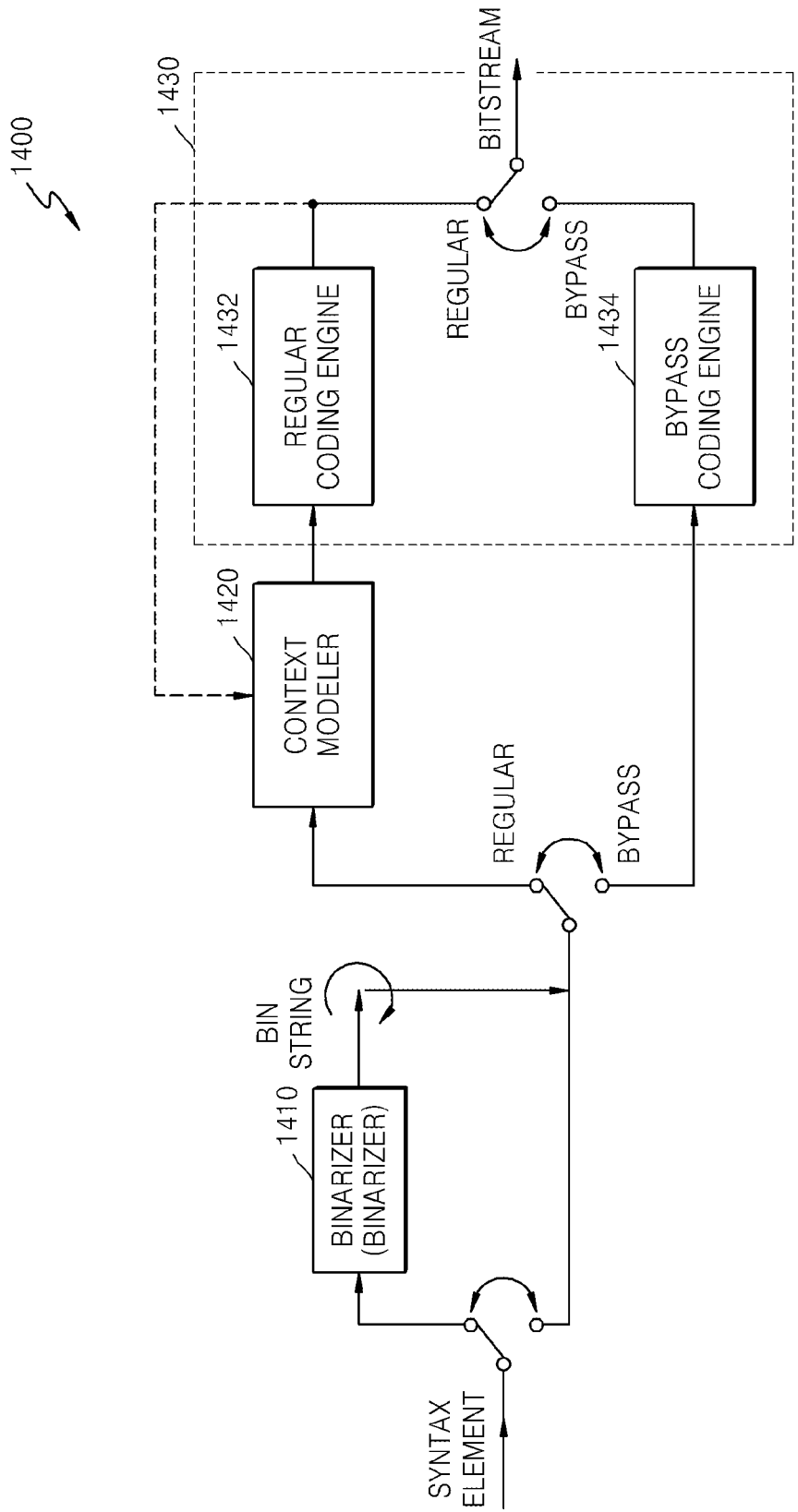
FIG. 14 is a block diagram of an entropy encoding apparatus according to an embodiment of the present invention.

FIG. 14 is a block diagram of an entropy encoding apparatus 1400 according to an embodiment of the present invention. The entropy encoding apparatus 1400 corresponds to the entropy encoder 120 of the video encoding apparatus 100 of FIG. 1.

Referring to FIG. 14, the entropy encoding apparatus 1400 includes a binarizer 1410, a context modeler 1420, and a binary arithmetic encoder 1430. Also, the binary arithmetic encoder 1430 includes a regular coding engine 1432 and a bypass coding engine 1434.

Syntax elements input to the entropy encoding apparatus 1400 may not be a binary value. When the syntax elements are not a binary value, the binarizer 1410 binarizes the syntax elements and outputs a bin string formed of binary values of 0 and 1. A bin indicates each bit of a stream formed of 0 or 1, and each bin is encoded via context adaptive binary arithmetic coding (CABAC). When a syntax element is data in which frequencies of 0 and 1 are the same, the syntax element is output to the bypass coding engine 1434 that does not use a probability value, and is encoded.

The context modeler 1420 provides a probability model of a current coding symbol to the regular coding engine 1432. In detail, the context modeler 1420 outputs a binary probability for encoding a binary value of the current coding symbol to the binary arithmetic encoder 1430. The current coding symbol denotes a binary value when a current syntax element to be encoded is binarized.

In order to determine a context model for a first syntax element of a current coding unit to be encoded, the context modeler 1420 may determine a context model to be applied to the first syntax element based on information about a second syntax element that is usable in the same current coding unit and different from the first syntax element. In general H.264 standards, in order to determine a context model for a certain syntax element of a current block, information about a syntax element that is same as the certain syntax element is obtained from a neighboring block, and a context to be applied to the certain syntax element is determined. However, in order to determine a context model for general entropy encoding as such, a same type of syntax element is obtained from a neighboring block, and thus such a syntax element of the neighboring block needs to be stored in a predetermined memory on a system and the predetermined memory needs to be accessed to determine a context model for entropy encoding a syntax element of a current block. However, according to an embodiment of the present invention, the context modeler 1420 does not use information about a neighboring coding unit but selects a context model for entropy encoding a first syntax element by using a second syntax element usable in a current coding unit, and thus a number of accessing a memory may be reduced and a size of the memory for storing syntax elements may be reduced.

Also, as described below, the context modeler 1420 may obtain a first syntax element having the same type as the first syntax element of the current coding unit from a neighboring coding unit, and determine a context model for entropy encoding the first syntax element of the current coding unit by combining the second syntax element obtained from the current coding unit and the first syntax element obtained from the neighboring coding unit.

A context model is a probability model of a bin, and includes information about which one of 0 and 1 corresponds to an MPS and an LPS, and a probability of the MPS or LPS.

The regular coding engine 1432 performs binary arithmetic encoding on a current coding symbol based on information about the MPS and LPS, and information about the probability of the MPS or LPS provided from the context modeler 1420.

A process of determining a context model for entropy encoding syntax elements, which is performed by the context modeler 1420 of FIG. 14 will now be described in detail.

Figure 15:
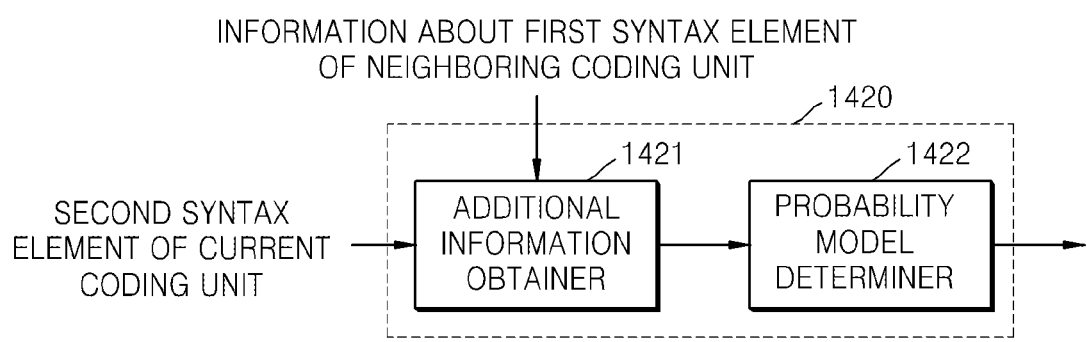
FIG. 15 is a block diagram of a context modeler of FIG. 14.

FIG. 15 is a block diagram of the context modeler 1420 of FIG. 14.

Referring to FIG. 15, the context modeler 1420 includes an additional information obtainer 1421 and a probability model determiner 1422.

The additional information obtainer 1421 obtains information about second syntax elements of a current coding unit usable while entropy encoding a first syntax element of a current data unit. For example, the second syntax element includes information about a size of the current data unit, relative size information indicating a relative size of the current data unit including the first syntax element in relation to a data unit in a higher layer and having a larger size than the current data unit, color type information of a color picture to which a data unit belongs, and prediction mode information. The second syntax element is additional information of the current coding unit usable at a point of time when the first syntax element is entropy encoded.

The probability model determiner 1422 determines a context model used to entropy encode a first syntax model based on obtained additional information about second syntax elements. In detail, when a second syntax element usable in entropy encoding a first syntax element that is currently encoded has 'a' state values, wherein 'a' is a positive integer, the probability model determiner 1422 determines a context index indicating one of 'a' context models according to the state values of the second syntax element to determine a context model used to entropy encode a first syntax element of a current coding unit. For example, when a size of a current data unit to which a first syntax element that is currently encoded has 5 state values of 2×2, 4×4, 8×8, 16×16, 32×32, and 64×64, and the size of the current data unit is used as a second syntax element, the probability model determiner 1422 may set 5 or less context models according to the size of the current data unit, which is the second syntax element, and may determine and output a context index indicating a context model used during entropy encoding the first syntax element of the current data unit based on the size of the current data unit, i.e., the second syntax element.

Alternatively, the probability model determiner 1422 may determine a context model for entropy encoding a first syntax element of a current coding unit by using a plurality of second syntax elements. In detail, when n denotes a number of second syntax elements used to determine a context model, wherein n denotes an integer, and $a_i$ denotes a number of state values of each of the n second syntax elements, wherein i is an integer from 1 to n, one context model used to entropy encode the first syntax element may be determined from among a plurality of context models based on $a_1 * a_2 * \ldots * a_n$, that is a number of combinations of the state values of the second syntax elements.

For example, when it is assumed that a CBF flag coded_block_flag that is a flag indicating whether a non-zero transformation coefficient exists in a transformation unit has 12 context models, a context model for entropy encoding a CBF flag of a current transformation unit may be determined based on color component information of a picture to which the current transformation unit belongs, and size information of the current transformation unit. It is assumed that the color component information is one of Y, Cb, and Cr, and an index color_type_index indicating a color component is set to 0, 1, and 2 respectively with respect to Y, Cb, and Cr. Also, it is assumed that an index TU_Block_size_index indicating a size of a transformation unit is set to 0, 1, 2, and 3 respectively with respect to 4×4, 8×8, 16×16, and 32×32. In this case, the probability model determiner 1422 may obtain a context index CtxIdx indicating a context model for entropy encoding the CBF flag of the current transformation unit by using the index color_type_index and the index TU_Block_size_index, which are other syntax elements, according to an equation: CtxIdx=color_type_index*4+TU_Block_size_index. As described above, by selecting a context model using information about other syntax elements in the same current coding unit, a number of accessing a memory and a size of the memory may be reduced.

In the above example, a CBF flag uses size information of a transformation unit and color component information, but a first syntax element to be entropy encoded and a second syntax element used to select a context model may be variously set by using currently usable additional information of a data unit.

The additional information obtainer 1421 obtains a first syntax element that is the same type as the first syntax element to be currently entropy encoded, from a neighboring data unit of the current data unit, as well as the additional information of the current data unit. The probability model determiner 1422 may determine a probability model for entropy encoding the first syntax element of the current data unit by using the second syntax element of the current coding unit, which is different from the first syntax element obtained from the neighboring coding unit. For example, it is assumed that the first syntax element of the current data unit to be encoded is a split flag indicating whether the current data unit is split. In this case, the probability model determiner 1422 may obtain a split flag from a left or upper neighboring data unit, and select a context model for entropy encoding a split flag of the current data unit through an equation: ctxIdx=split_flag_left+(depth>>1), by using other syntax elements excluding a split flag split_flag_neighbor of the neighboring data unit and the split flag of the current data unit, for example, by using a depth of the current data unit, as the second syntax element. Meanwhile, the additional information obtainer 1421 may obtain information about the first syntax element having the same type as the first syntax element of the current data unit from the left neighboring data unit of the current data unit in order to entropy encode the first syntax element of the current data unit. Since information about a data unit is generally stored in and read from a buffer in a line unit, a size of the buffer may be reduced by obtaining information about first syntax elements from a current data unit and left neighboring data unit of the current data unit rather than using information about first syntax elements of a current data unit and a top neighboring data unit of the current data unit. Also, considering a processing order of a raster scan, etc., the size of the buffer may be reduced by using information about the left neighboring data unit of the current data unit, which is on the same line as the current data unit and processed before the current data unit, rather than using information about the top neighboring data unit, while entropy encoding the first syntax element of the current data unit.

A process of entropy encoding information of coding units having a hierarchical structure described above with reference to FIGS. 1 through 13, as a first syntax element will now be described in detail.

Figure 16:
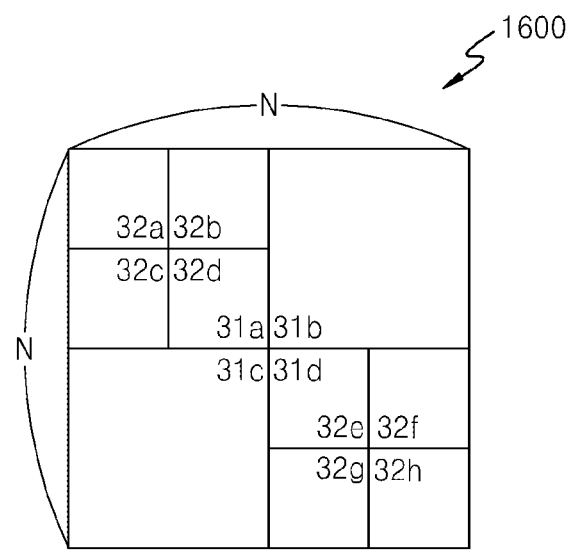
FIG. 16 is a diagram for describing a data unit having a hierarchical structure and data unit split information having a hierarchical structure, according to an embodiment of the present invention.
Figure 16:
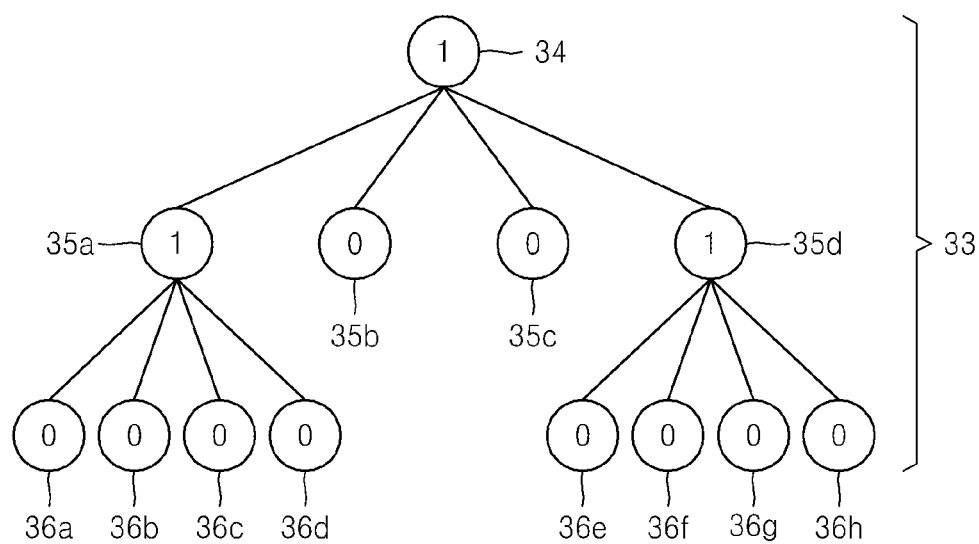

FIG. 16 is a diagram for describing a data unit 1600 having a hierarchical structure and data unit split information 33 having a hierarchical structure, according to an embodiment of the present invention. Here, a data unit may be any one of a coding unit, a prediction unit, and a transformation unit described above.

As described above, according to an embodiment of the present invention, encoding is performed by using coding units, prediction units, and transformation units having hierarchical structures. In FIG. 16, the data unit 1600 having a size of N×N and in level 0 that is an uppermost level is split into data units 31*a* through 31*d* in level 1 that is a level lower than the uppermost level, and the data units 31*a* and 31*d* are respectively split into data units 32*a* through 32*d* and 32*e* through 32*h* in level 2 that is a level lower than level 1. A split flag indicating whether each data unit is split into data units in a lower level may be used as a symbol for indicating a hierarchical structure of data units. For example, when a split flag of a current data unit is 1, the current data unit may be split into a lower level, and when a split flag is 0, the current data unit may not be split.

As the data units 30, 31*a* through 31*d*, and 32*a* through 32*h* form a hierarchical structure, split information of the transformation units 30, 31*a* through 31*d*, and 32*a* through 32*h* may also form a hierarchical structure. In other words, the data unit split information 33 includes data unit split information 34 in level 0 that is an uppermost level, data unit split information 35*a* through 35*d* in level 1, and data unit split information 36*a* through 36*h* in level 2.

The data unit split information 34 in level 0 in the data unit split information 33 having the hierarchical structure denotes that the data unit 30 in level 0 is split. Similarly, the data unit split information 35*a* and 35*d* in level 1 respectively denote that the data units 31a and 31d in level 1 are split into the data units 32a through 32d and 32e through 32h in level 2.

The data units 31b and 31c in level 1 are no longer split, and correspond to leaf nodes that do not include a child node in a tree structure. Similarly, the data units 32a through 32h in level 2 correspond to leaf nodes that are no longer split into lower levels.

As such, a split flag indicating whether a data unit in an upper level is split into data units in lower levels may be used as a symbol indicating a hierarchical structure of data units.

While entropy encoding a split flag indicating a hierarchical structure of data units, the entropy encoder 120 may entropy encode split flags of data units of all nodes, or entropy encode only split flags of data units corresponding to leaf nodes that do not have a child node.

Figure 17A:
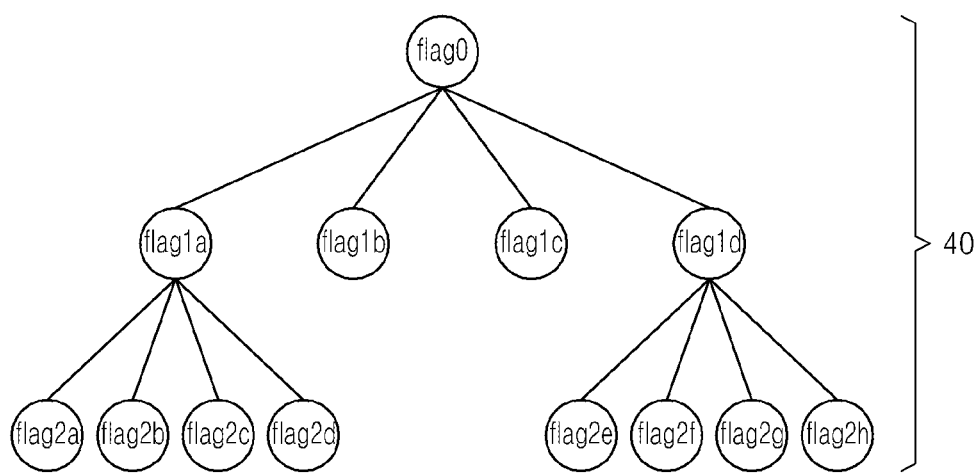
FIGS. 17A and 17B are reference diagrams of symbols indicating a hierarchical structure of data units, according to embodiments of the present invention.
Figure 17B:
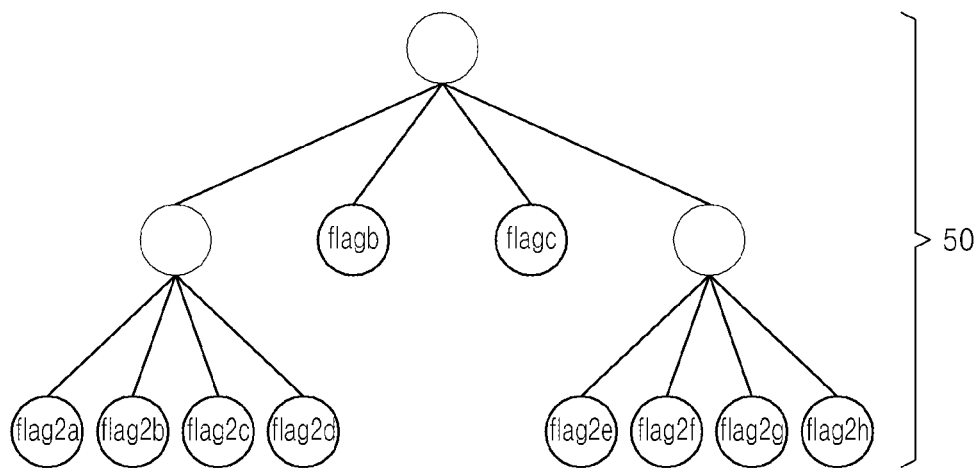

FIGS. 17A and 17B are reference diagrams of symbols indicating a hierarchical structure of data units, according to embodiments of the present invention.

In FIGS. 17A and 17B, it is assumed that a flag is a split flag of a data unit indicating whether a data unit of each node is split into data units in a lower level, in the data unit split information 33 of FIG. 16. Referring to FIG. 17A, the entropy encoder 120 may entropy encode split flags flag0, flag1a through flag1d, and flag2a through flag2h of the data units 30, 31a through 31d, and 32a through 32h in all levels. Alternatively, as shown in FIG. 17B, the entropy encoder 120 may entropy encode only the split flags flag1b, flag1c, and flag2a through flag2h of the data units 31b, 31c, and 32a through 32h corresponding to leaf nodes that do not have a child node, because it is determined whether a data unit in an upper level is split based on whether a split flag exists in a data unit in a lower level. For example, in FIG. 17B, when the split flags flag2a through flag2d of the data units 32a through 32d in level 2 exist, the data unit 31a in level 1 that is the upper level of level 2 is obviously split into the data units 32a through 32d, and thus the split flag flag1a of the data unit 31a may not be encoded.

The video decoding apparatus 200 determine a hierarchical structure of data units by extracting and reading the split flags flag, flag1a through flag1d, and flag2a through flag2h of the data units 30, 31a through 31d, and 32a through 32h in all levels, according to a symbol hierarchical decoding mode. Alternatively, when only the split flags flag1b, flag1c, and flag2a through flag2h of the data units 31b, 31c, and 32a through 32h corresponding to leaf nodes are encoded, the video decoding apparatus 200 may determine a hierarchical structure of data units by determining the split flags flag0 and flag1a through flag1d of the data units 30 and 31a through 31d that are not encoded, based on the extracted split flags flag1b, flag1c, and flag2a through flag2h.

The context modeler 1420 may determine one of a plurality of context models for entropy encoding split flags indicating a hierarchical structure of data units, based on state values according to a combination of additional information.

FIGS. 18A and 18B are diagrams of context indexes for determining a context model according to a combination of additional information, according to embodiments of the present invention.

Referring to FIG. 18A, the context modeler 1420 may determine a context model to be used for entropy encoding a split flag of a current data unit, based on other usable additional information excluding a split flag of a data unit. When it is assumed that n pieces of additional information each has $a_i$ state values, wherein $a_i$ is an integer and i is an integer from 1 to n, the context modeler 1420 may determine a context model to be used for entropy encoding a split flag from among a plurality of context models, based on a context index CtxIdx determined according to a combination of $a_1 x a_2 x \ldots x a_n$ state values. As shown in FIG. 18A, when it is assumed that values of $a_1 x a_2 x \ldots x a_n$ respectively have combination values of $S_1, S_2, \ldots,$ and $S_m$, one context index is determined based on such m state values of $(S_1, S_2, \ldots,$ and $S_m)$.

Alternatively, as shown in FIG. 18B, the context modeler 1420 may determine a context index according to a combination value of additional information by grouping the m state values of $(S_1, S_2, \ldots,$ and $S_m)$.

Figures 19, 20:
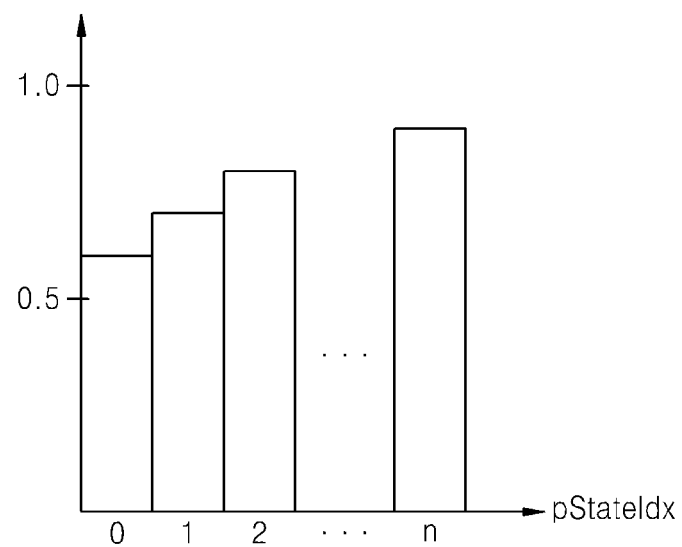
FIG. 19 is a reference diagram of a context model according to an embodiment of the present invention.
FIG. 20 is a graph of a probability value of a most probable symbol (MPS) according to an embodiment of the present invention.

FIG. 19 is a reference diagram of a context model according to an embodiment of the present invention.

The probability model determiner 1422 determines and outputs information about binary signals corresponding to an MPS and an LPS from among binary signals of 0 and 1, and about a probability value of the MPS or LPS by using the context index CtxIdx determined according to the combination of the additional information. Referring to FIG. 19, the probability model determiner 1422 stores probabilities of binary signals in a lookup table 1900, and outputs information about a probability value corresponding to the context index CtxIdx determined according to the combination of the additional information to the regular coding engine 1432. In detail, when a context index CtxIdx indicating a context model to be applied to a current symbol is determined based on combination of additional information of a current data unit, the probability model determiner 1422 may determine an index pStateIdx of a probability table corresponding to the context index CtxIdx, and a binary signal corresponding to an MPS. Also, the context modeler 1420 may similarly determine a context model for entropy encoding a syntax element of a current data unit from among a plurality of context modes, according to a combination of additional information of the current data unit and additional information of a neighboring data unit adjacent to the current data unit.

FIG. 20 is a graph of a probability value of an MPS according to an embodiment of the present invention.

A probability table shows probability values of an MPS, and when an index pStateIdx of the probability table is assigned, a probability value of a corresponding MPS is determined. For example, when the context modeler 1420 determines and outputs a context index CtxIdx of a context model to be used for encoding of a current symbol to be 1, the probability model determiner 1422 determines the index pStateIndx to be 7 and the MPS to be 0, which correspond to the context index CtxIdx 1 from among the context models shown in FIG. 19. Also, the probability model determiner 1422 determines a probability value of the MPS corresponding to the index pStateIdx 7 from among the probability values of the MPS pre-set as shown in FIG. 20. Since a sum of the probability values of MPS and LPS is 1, once the probability value of MPS or LPS is determined, the remaining probability value may be determined.

Meanwhile, the probability model determiner 1422 may update the index pStateIdx based on which one of the MPS and the LPS is encoded whenever one bin is encoded by the regular coding engine 1432, thereby updating the probability values of the MPS and LPS while considering a generation statistic of a binary signal. For example, the probability model determiner 1422 may set transIdxMPS that is a value of the index pStateIdx after an update while encoding the MPS, and tranIdxLPS that is a value of the index pStateIdx after an update while encoding the LPS in a form of a lookup table while considering encoding results of the regular coding engine 1432, and then update the index pStateIdx per encoding operation to change the probability value of the MPS.

The regular coding engine 1432 entropy encodes and outputs a binary signal of a symbol about a current syntax element based on information about a binary signal and probability value corresponding to an MPS or LPS.

Figure 21:
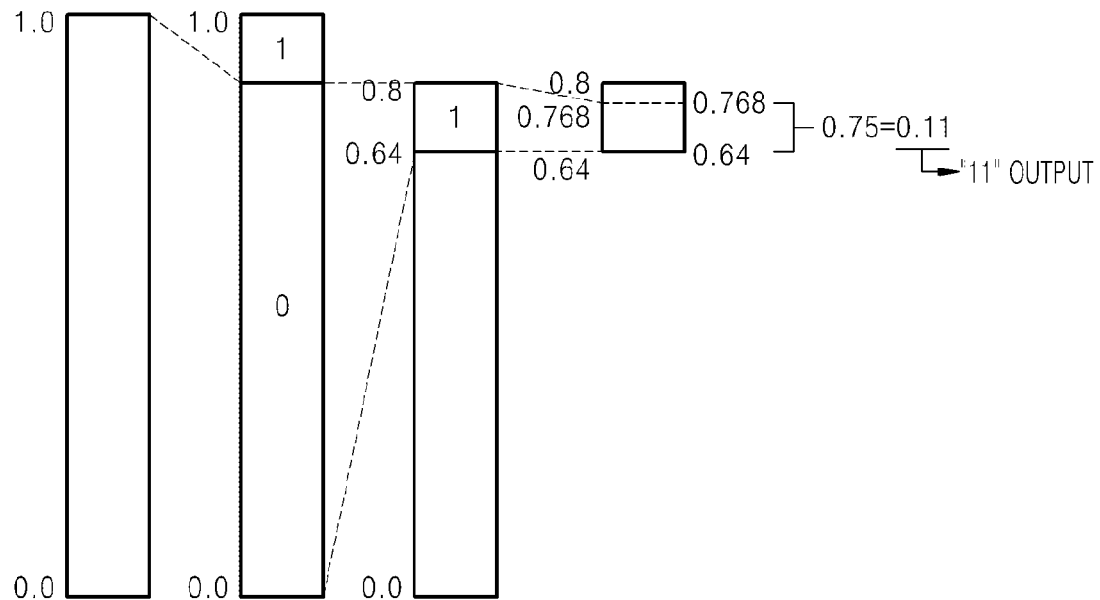
FIG. 21 is a diagram for describing a binary arithmetic encoding operation performed by a regular coding engine of FIG. 14.

FIG. 21 is a diagram for describing a binary arithmetic encoding operation performed by the regular coding engine 1430 of FIG. 14. In FIG. 21, it is assumed that a split flag indicating a hierarchical structure of data units has a binary value of 010, a probability of 1 is 0.2, and a probability of 0 is 0.8. Here, the probabilities of 1 and 0 are updated whenever a binary value is encoded, but for convenience of description, it is assumed that the probabilities are fixed.

Referring to FIG. 21, when an initial bin value "0" is encoded from among a binary value "010", [0.0 to 0.8] that is lower 80% of an initial section [0.0 to 1.0] is updated as a new section, and when a next bin value "1" is encoded, [0.64 to 0.8] that is upper 20% of [0.0 to 0.8] is updated as a new section. Then, when a last bin value "0" is encoded, [0.64 to 0.768] that is lower 80% of [0.64 to 0.8] is set as a new section. In a binary number 0.11 corresponding to a real number 0.75 between the final section [0.64~0.768], "11" below a decimal point is output in a bitstream corresponding to the binary value "010" of the split flag.

Figure 22:
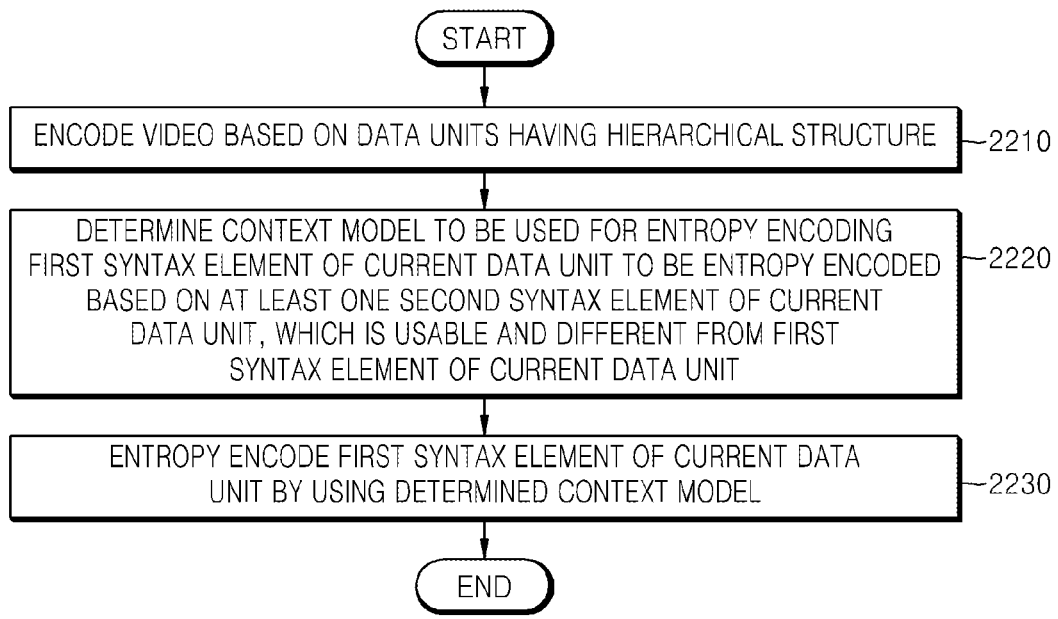
FIG. 22 is a flowchart illustrating an entropy encoding method according to an embodiment of the present invention.

FIG. 22 is a flowchart illustrating an entropy encoding method according to an embodiment of the present invention.

Referring to FIG. 22, the hierarchical encoder 110 encodes a video based on data units having a hierarchical structure, in operation 2210. In operation 2220, the context modeler 1420 determines a context model to be used for entropy encoding a first syntax element of a current data unit to be entropy encoded based on at least one second syntax element of the current data unit, wherein the second syntax element is usable and different from the first syntax element of the current data unit. As described above, when a number of the second syntax elements is n, wherein n is an integer, and a number of state values of each of the n second syntax elements is $a_i$, wherein i is an integer from 1 to n, the context modeler 1420 may determine a context model indicated by a context index CtxIdx determined based on $a_1 * a_2 * \ldots a_n$ that is a number of combinations of the state values of the second sytax elements.

In operation 2230, the regular coding engine 1432 entropy encodes the first syntax element of the current data unit by using the determined context model.

Figure 23:
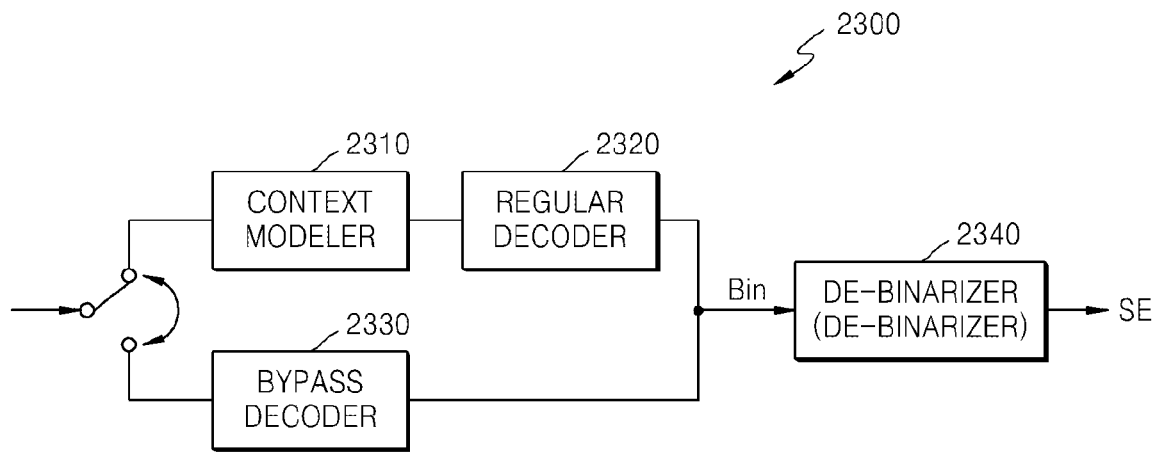
FIG. 23 is a block diagram of an entropy decoding apparatus according to an embodiment of the present invention.

FIG. 23 is a block diagram of an entropy decoding apparatus 2300 according to an embodiment of the present invention.

Referring to FIG. 23, the entropy decoding apparatus 2300 includes a context modeler 2310, a regular decoder 2320, a bypass decoder 2330, and a de-binarizer 2340. The entropy decoding apparatus 2300 performs inverse processes of the entropy encoding process performed by the entropy encoding apparatus 1400 described above.

A symbol encoded according to bypass coding is output to and decoded by the bypass decoder 2330, and a symbol encoded according to regular coding is decoded by the regular decoder 2320. The regular decoder 2320 performs arithmetic decoding on a binary value of a current coding symbol based on a context model provided by the context modeler 2310.

Like the context modeler 1420 of FIG. 14, the context modeler 2310 determines a context model used for entropy decoding a first syntax element of a current data unit based on at least one second syntax element of the current data unit, which is usable and different from the first syntax element of the current data unit. As described above, the context modeler 2310 may obtain information about a first syntax element having the same type as the first syntax element of the current data unit from a neighboring data unit adjacent to the current data unit, and determine the context model for entropy decoding the first syntax element of the current data unit by using the first syntax element obtained from the neighboring data unit and the second syntax element obtained from the current data unit.

An operation of the context modeler 2310 of FIG. 23 is the same as that of the context modeler 1420 of FIG. 14, except that the operation of the context modeler 2310 is performed in terms of decoding, and thus details thereof are omitted herein.

The de-binarizer 2340 restores bin strings restored by the regular decoder 2320 or the bypass decoder 2330 to a syntax element.

Figure 24:
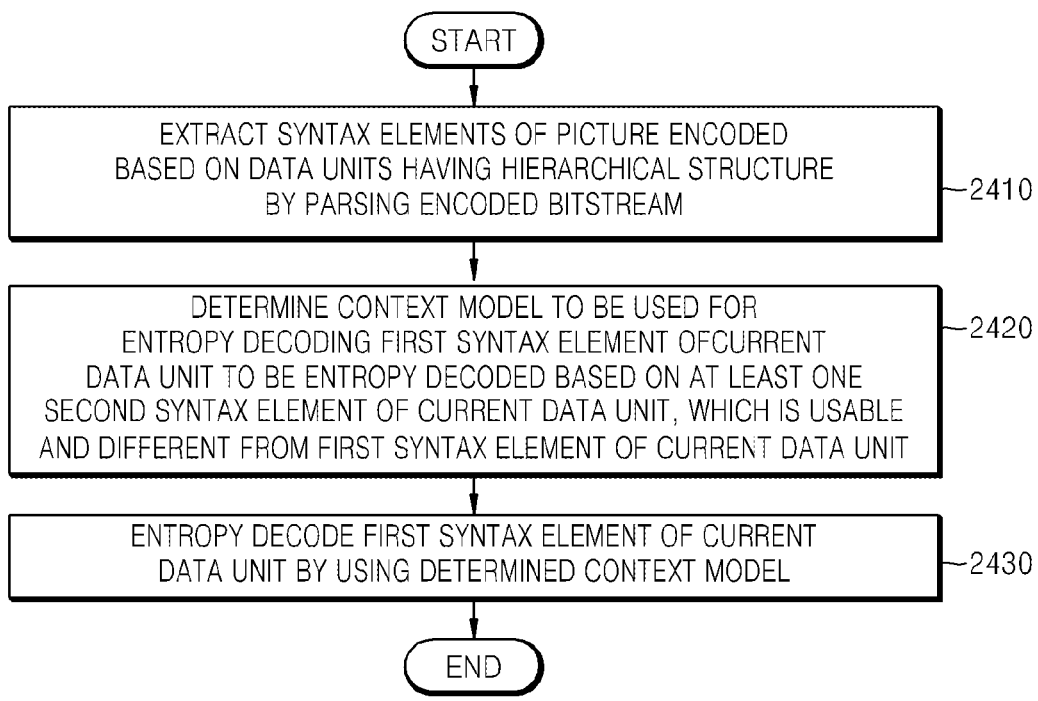
FIG. 24 is a flowchart illustrating an entropy decoding method according to an embodiment of the present invention.

FIG. 24 is a flowchart illustrating an entropy decoding method according to an embodiment of the present invention.

Referring to FIG. 24, the syntax element extractor 210 extracts syntax elements of a picture encoded based on data units having a hierarchical structure by parsing an encoded bitstream, in operation 2410. In operation 2420, the context modeler 2310 of the entropy decoding apparatus 2300 determines a context model for entropy decoding a first syntax element of a current data unit to be entropy decoded based on at least one second syntax element of the current data unit, which is usable and different from the first syntax element of the current data unit. As described above, the context modeler 2310 may obtain a first syntax element having the same type as the first syntax element of the current data unit from a left or top neighboring data unit of the current data unit, as well as the second syntax element of the current data unit, and select the context model for entropy decoding the first syntax element of the current data unit by combining the first syntax element obtained from the left or top neighboring data unit and the second syntax element obtained from the current data unit. In operation 2430, the regular decoder 2320 entropy decodes the first syntax element of the current data unit by using the determined context model.

The invention may also be embodied as computer readable codes on a computer readable recording medium. The computer readable recording medium is any data storage device that may store data which may be thereafter read by a computer system. Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion.

While this invention has been particularly shown and described with reference to preferred embodiments thereof, it will be understood by those of ordinary skill in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A video decoding method comprising:

obtaining, from a bitstream, a split transformation flag indicating whether a transformation unit included in a coding unit is split;

obtaining a current transformation unit from the coding unit based on the split transformation flag;

determining a context model using a context model index determined based on a size of the current transformation unit and a value of a color component index of a picture to which the current transformation unit belongs, without using any syntax elements from blocks neighboring the coding unit, wherein the color component index is set with respect to a luminance color component, a first chrominance color component, and a second chrominance color component, and the color component index for the luminance color component has a value of zero, the color component index for the first chrominance color component has a value of one, and the color component index for the second chrominance color component has a value of two;

obtaining a transformation coefficient flag indicating whether there exists a non-zero coefficient in a block of the current transformation unit by decoding the bitstream using Context Adaptive Binary Arithmetic Coding (CABAC) based on the context model; and obtaining a transformation coefficient included in the current transformation unit based on the transformation coefficient flag, wherein the decoding the bitstream using Context Adaptive Binary Arithmetic Coding (CABAC) further comprises:

determining a Most Probable Symbol (MPS) between 0 and 1 based on the context model;

determining a probability state index based on the context model; and decoding the bitstream based on the determined MPS and the probability state index.

* * * * *